(12) United States Patent
Yamaoka et al.

(10) Patent No.: US 7,073,294 B2
(45) Date of Patent: Jul. 11, 2006

(54) WEATHER STRIP FOR DOOR PROVIDED WITH LATCH

(75) Inventors: Koso Yamaoka, Hiroshima-ken (JP); Yukihiro Moriyama, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 151 days.

(21) Appl. No.: 10/773,070

(22) Filed: Feb. 5, 2004

(65) Prior Publication Data

US 2004/0163321 A1   Aug. 26, 2004

(30) Foreign Application Priority Data

Feb. 20, 2003   (JP) .............................. 2003-042007

(51) Int. Cl.
E06B 7/16   (2006.01)
B60J 10/08   (2006.01)

(52) U.S. Cl. .................. 49/479.1; 49/475.1; 296/146.9

(58) Field of Classification Search ............... 49/479.1, 49/475.1, 490.1; 296/146.9; 277/921, 630
See application file for complete search history.

(56) References Cited

U.S. PATENT DOCUMENTS

| | | | | |
|---|---|---|---|---|
| 4,817,336 A | * | 4/1989 | Kisanuki | 49/479.1 |
| 4,910,918 A | * | 3/1990 | Naples et al. | 49/479.1 |
| 4,977,706 A | * | 12/1990 | Kisanuki | 49/479.1 |
| 4,979,333 A | * | 12/1990 | Goto et al. | 49/479.1 |
| 5,155,938 A | * | 10/1992 | Nozaki | 49/479.1 |
| 5,269,101 A | * | 12/1993 | Nozaki et al. | 49/479.1 |
| 5,566,510 A | * | 10/1996 | Hollingshead et al. | 49/479.1 |
| 5,639,533 A | * | 6/1997 | Yamashita | 49/479.1 |
| 6,237,287 B1 | * | 5/2001 | Nakagawa et al. | 49/479.1 |
| 6,527,278 B1 | * | 3/2003 | Norris | 277/921 |
| 6,536,834 B1 | * | 3/2003 | Yamashita et al. | 296/146.9 |
| 6,598,347 B1 | * | 7/2003 | Hattori | 49/479.1 |
| 6,641,205 B1 | * | 11/2003 | Russell et al. | 296/146.9 |
| 6,725,605 B1 | * | 4/2004 | Schlachter et al. | 49/479.1 |
| 6,751,908 B1 | * | 6/2004 | Nakai et al. | 49/475.1 |
| 6,810,624 B1 | * | 11/2004 | Fujimura et al. | 49/479.1 |

FOREIGN PATENT DOCUMENTS

JP   2000-28074   1/2000

* cited by examiner

*Primary Examiner*—Hugh B. Thompson, II
(74) *Attorney, Agent, or Firm*—Flynn, Thiel, Boutell & Tanis, P.C.

(57) ABSTRACT

There is provided a door weather strip attached to a door frame of an automobile provided with a latch. An automobile body is equipped with a door provided with a latch and a door not provided with a latch. The automobile body is not equipped with a center pillar. An opening for installing a latch is formed at an upper end of one side of a door frame of said door, where hinges are unprovided. An inner sidewall of a molded part of the door weather strip is attached to the upper end of the door frame. The inner sidewall is provided as the bottom end of the molded part and reaches right above the opening. A drainage rib is provided at a rear face of said sidewall for directing water into the opening.

2 Claims, 4 Drawing Sheets

US 7,073,294 B2

WEATHER STRIP FOR DOOR PROVIDED WITH LATCH

FIELD OF THE INVENTION

The invention relates to a weather strip attached to a door of an automobile provided with a latch, which also comprises a door unprovided with a latch, and is unequipped with a center pillar.

BACKGROUND OF THE INVENTION

There has been used a conventional door weather strip for a door of an automobile provided with a latch, which comprises a pair of doors in a double-doored closet style (double doors opening outward or a French door style) at one side of an automobile, where one of the doors is provided with a latch and the other is not. A butyl sealer (or an EPT sealer) is provided between a molded part of the weather strip, which forms a corner part thereof, and a door frame provided with a latch in order to prevent water from invading into an interior of the automobile.

However, there is a problem in the prior art, that is, rainwater and the like intrudes into an interior of the automobile when the automobile is left under the rainwater and the like for many hours. Such problem occurs when the butyl sealer (or the EPT sealer) is improperly provided or press-bonding force is insufficiently provided. It is difficult to properly stick the butyl sealer (or the EPT sealer) to a proper position with appropriate press-bonding force because sticking work is usually done on a case-by-case basis.

There has been a technique which provides a effective drainage function in a waist line of an automobile having doors of an ordinal style (see, for example, Japanese Unexamined Patent Publication No. 2000-280748). However, such an effective drainage function has not been provided in doors of a double-doored closet style where one of the doors comprises a latch at an upper corner thereof.

SUMMARY OF THE INVENTION

The invention has been developed to resolve those problems as described above, and it is an object of the invention to provide a weather strip installed to a door provided with a latch, wherein an effective drainage function is provided at a molded part forming a top corner thereof at one side where hinges for installing the door is not provided. The automobile having this weather strip is not equipped with a center pillar and is comprised of a pair of doors, one is provided with a latch and the other is not.

Referring to FIGS. 1 to 5, a first and second aspects of the invention will be described hereinafter.

A door weather strip according to a first aspect of the invention is attached to a door frame 3d of an automobile provided with a latch. An automobile body 1 is equipped with a door 3 provided with a latch 6 as well as a door 2 not provided with a latch. The automobile body 1 is not equipped with a center pillar. An opening 3f for installing a latch is formed at an upper end of one side of a door frame 3d of the door 3, where hinges are not provided. An inner sidewall 12 of a molded part 11 of the door weather strip is attached to the upper end of the door frame 3d. The inner sidewall 12 is provided as the bottom end thereof reaches right above the opening 3f. A drainage rib 13 is provided at a rear face 12a of the sidewall 12 for directing water into the opening 3f.

A door weather strip according to a second aspect of the invention is attached to a door frame 3d of an automobile provided with a latch. An automobile body 1 is equipped with a door 3 provided with a latch 6 and a door 2 not provided with a latch. The automobile body 1 is not equipped with a center pillar. An opening 3f for installing a latch is formed at an upper end of one side of a door frame 3d of the door 3, where hinges are unprovided. An inner sidewall 12 of a molded part 11 of the door weather strip is attached to the upper end of the door frame 3d. The inner sidewall 12 is provided as the bottom end of the molded part and reaches right above the opening 3f. A drainage wall 14 is provided at the bottom of the sidewall 12 as the bottom end of the wall 14 reaches to an upper portion of the opening 3f. A drainage rib 13 is provided at a rear face 12a of the sidewall 12 for directing water into the opening 3f.

BRIEF DESCRIPTION OF TIE DRAWINGS

PREFERRED EMBODIMENTS OF THE INVENTION

Figure 1:
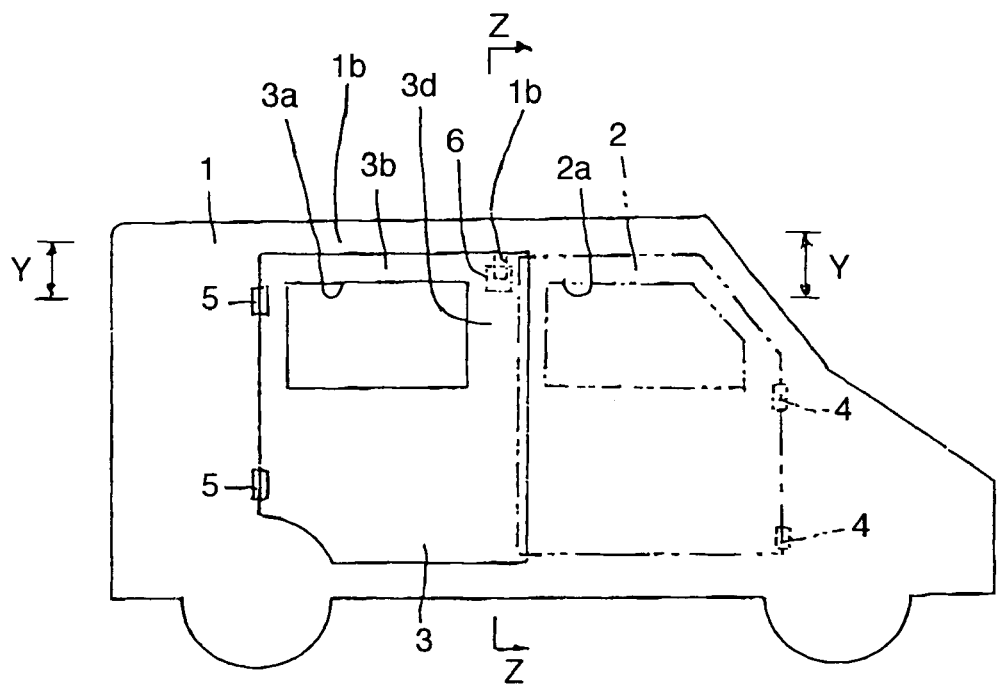
FIG. 1 is a side view of an automobile equipped with doors in a double-doored closet style where a rear door weather strip according to the invention is comprised.
Figure 2:
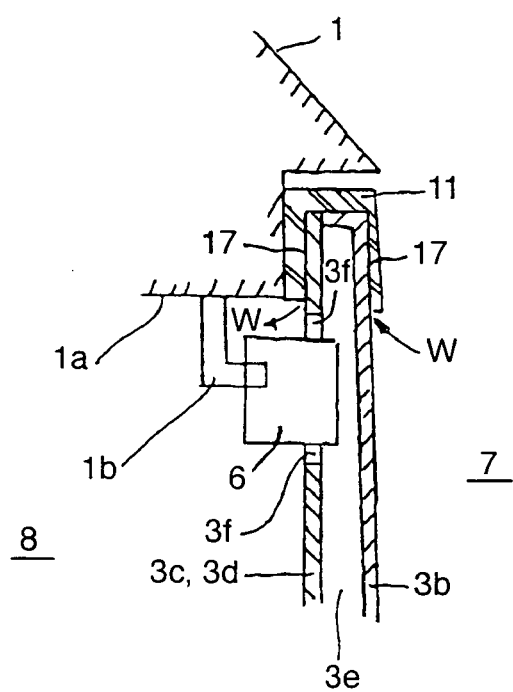
FIG. 2 is a sectional view showing a closed rear door along line Z—Z within a Y—Y range in FIG. 1.
Figure 3:
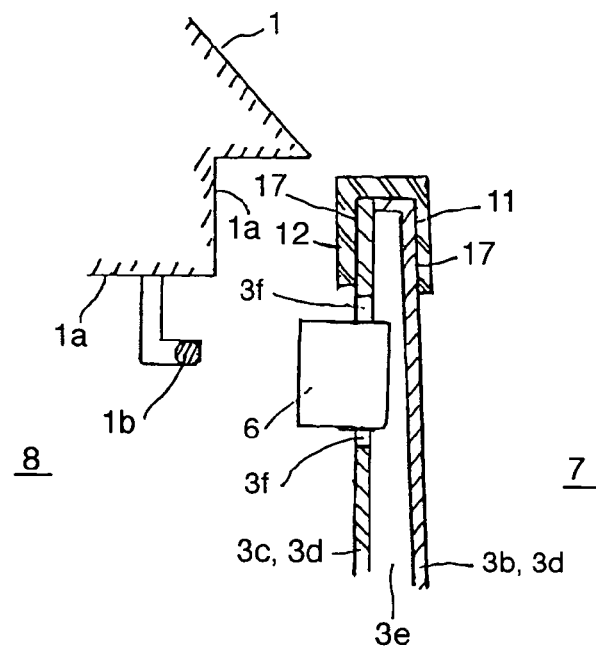
FIG. 3 is a sectional view showing an open rear door along line Z—Z within a Y—Y range in FIG. 1.
Figure 4:
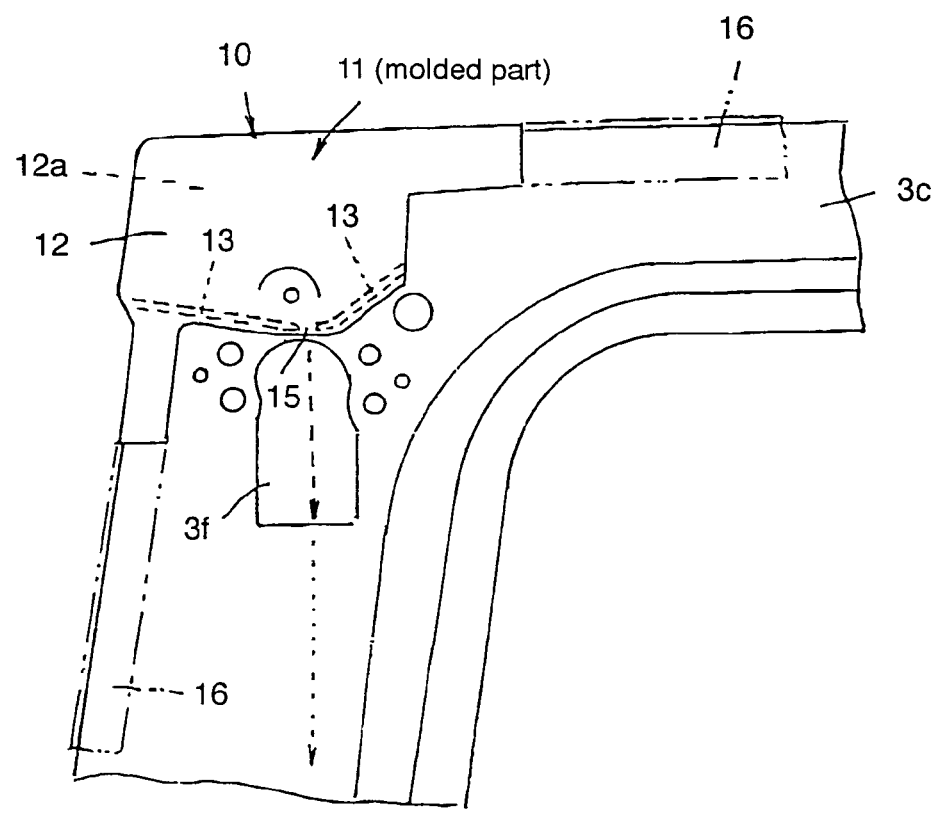
FIG. 4 is a side view of a primary part of a first embodiment of a door weather strip according to the invention, showing a right-side door viewed from an inside of the automobile.
Figure 5:
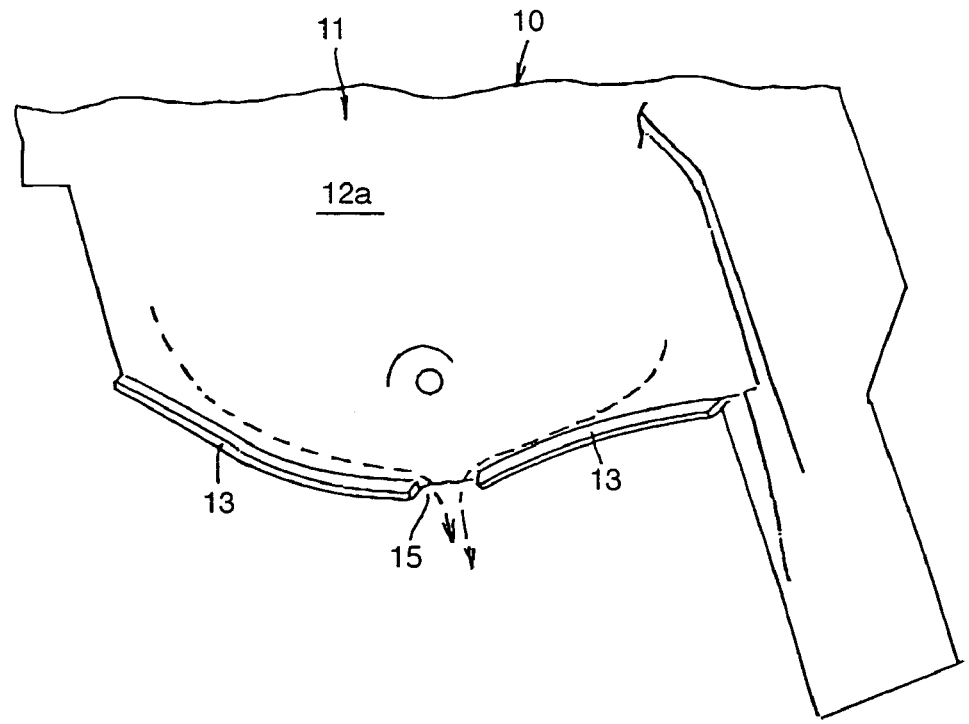
FIG. 5 is an enlarged side view of a primary part of a rear face of an inner sidewall of a door weather strip provided with a latch as shown in FIG. 4, illustrating a right-side door viewed from an outside of the automobile.
Figure 6:
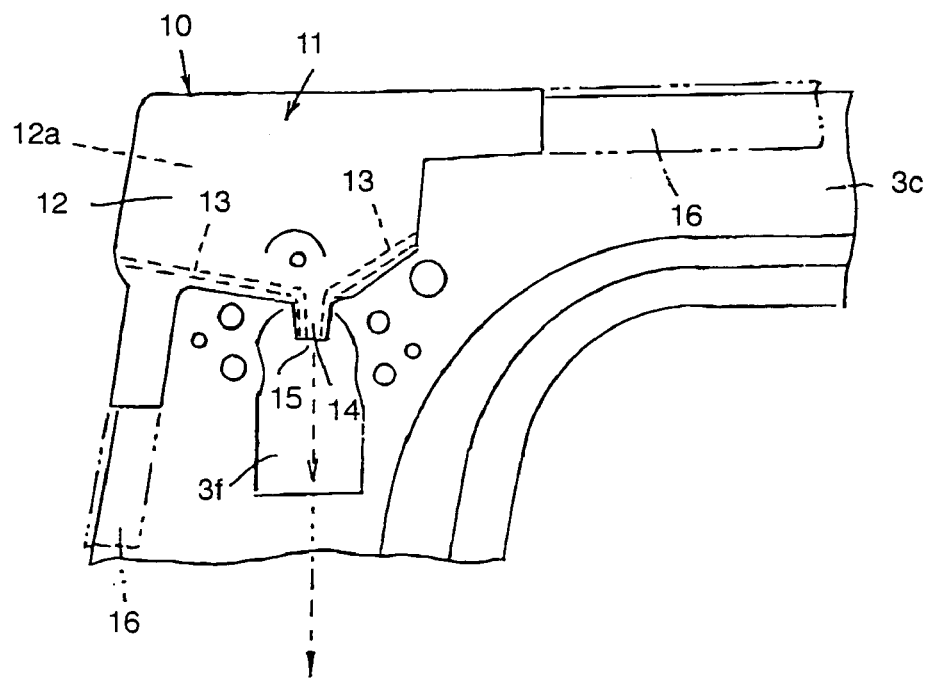
FIG. 6 is a side view of a primary part of a second embodiment of a door weather strip according to the invention, showing a right-side door viewed from an inside of the automobile.
Figure 7:
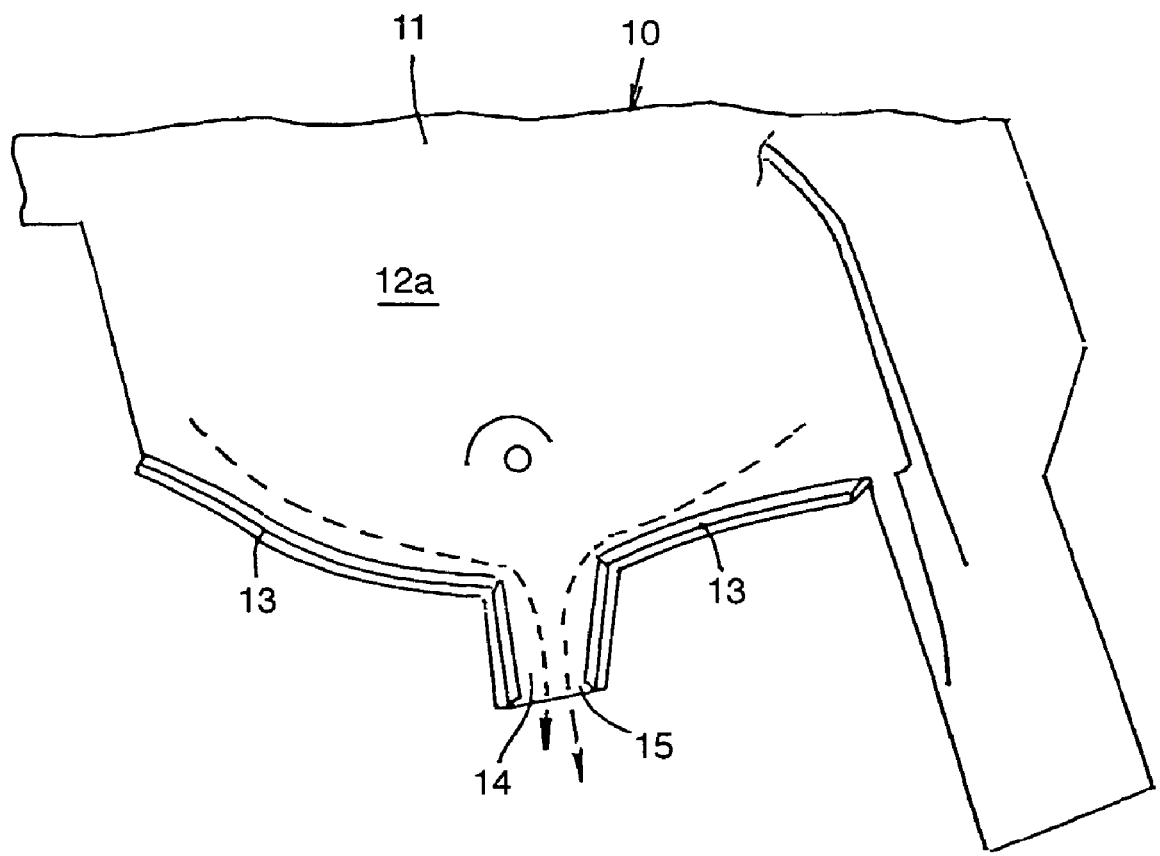
FIG. 7 is an enlarged side view of a primary part of a rear face of an inner sidewall of the door weather strip as shown in FIG. 6, showing a right-side door viewed from an outside of the automobile.

In FIGS. 1 to 3, reference numeral 1 indicates an automobile body, 7 indicates an outside of the automobile, 8 indicates an inside of the automobile, 1a indicates a roof-side frame, and 1b indicates a striker protruding downward from the roof-side frame. Reference numeral 2 indicates a front door which revolves around hinges 4 to open in a frontward direction, and 2a indicates an opening of a front door. Reference numeral 3 indicates a rear door provided with a latch, which revolves around hinges 5 and is closed before the front door is closed. Reference numeral 3a indicates an opening of a rear door, 3b indicates an outer panel, and 3c indicates an inner panel. A rear door frame 3d is formed with a combination of an outer panel 3b and an inner panel 3c, and there is provided a hollow 3e in the rear door frame 3d, which is wide open in a downward direction. Reference numeral 3f indicates an opening for installing a latch, which is formed in the inner panel 3c. The latch 6 engages with the striker 1b when the rear door 3 is closed.

According to this embodiment, a molded part 11 of the rear door weather strip 10 is attached to a front upper corner of the rear door 3. There is formed an opening 3f below the molded part 11 of the rear door weather strip 10. As shown in FIG. 2, water W tends to intrude into an inside 8 of the automobile through inbetween the outer panel 3b and the molded part 11 via the lower edge of the molded part 11. Then the water intrudes between the inner panel 3c and the molded part 11, and reaches to the inside 8 through the inner bottom end of the molded part 11.

Referring to FIGS. 1 to 5, a first embodiment of a rear door weather strip 10 according to the invention is described. The rear door weather strip 10 is attached to the rear door frame 3d of an automobile. The body 1 of the automobile is equipped with a front door 2 and a rear door 3 in a double-doored closet style. The automobile body 1 is not equipped with a center pillar. There is provided an opening 3f for installing a latch 6 at a front upper end of the rear door frame 3d.

In this automobile having the doors in a double-doored closet style, the front door 2 is connected to the body 1 at its front end with hinges 4, while the rear door is connected to the body 1 at its back end with hinges 5. Further, since the automobile body 1 is not provided with the center pillar, the front-end part of the rear door 3 is obliged to perform a function of the center pillar. For that reason, the rear door 3 is provided with the latch 6 at the front end thereof for securing the rear door 3 to the automobile body 1 capable of opening and closing. When the front and rear doors are closed, the front end of the rear door 3 overlaps the rear end of the front door 2.

With such a construction as described above, an inner sidewall 12 of the molded part 11 is provided as it reaches right above the opening 3f. The inner sidewall 12 is a part of the molded part 11 making a resilient contact with the inner side of the rear door frame 3d. There is provided a drainage rib 13 at a rear face 12a of the side wall 12, which is a surface facing the rear door frame 3d. The drainage rib 13 directs water W into the opening 3f. The drainage rib 13 is formed to incline in a downward direction in the rear face 12 toward the central part thereof, which is wide open. The central part of the rib 13 is used as a drain outlet 15.

Similar to the conventional case, a butyl sealer (or an EPT sealer) 17 is provided between the upper part of the rear face 12a of the inner sidewall 12 of the molded part 11 and the rear door frame 3d. An extrusion-molded part 16 is continuously connected to the molded part 11.

According to the rear door weather strip 10, when some rainwater and the like intrudes from the upper end part of the rear door frame 3d through the butyl sealer (or the EPT sealer) 17 provided between the upper part of the rear face 12a of the molded part 11 and the rear door frame 3d, the rainwater and the like is directed to the opening 3f by the drainage rib 13. Then the rainwater and the like is drained outside through a drain hole formed at the bottom of the rear door frame 3d after passing through the opening 3f and a hollow space 3e formed inside the door frame 3d between the inner frame and the outer frame. Accordingly, it is successfully prevented that the rainwater and the like intrudes into the interior of the automobile.

Referring to FIGS. 1 to 3, 6 and 7, a second embodiment of a rear door weather strip 10 according to the invention will be described. The rear door weather strip 10 according to the embodiment is also attached to a rear door frame 3d of an automobile. The body 1 of the automobile is equipped with a front door 2 and rear door 3 in a double-doored closet style, while it is not equipped with a center pillar. There is provided an opening 3f for an installation of a latch at the front upper end of the rear door frame 3d.

An inner sidewall 12 of a molded part 11, which is attached to an upper front end of the rear door frame 3d, is provided as such that it reaches right above the opening 3f. A drainage wall 14 is provided at the bottom end of the inner sidewall 12, which reaches to the upper portion of the opening 3f. Further, drainage rib 13 for guiding water W to the opening 3f is continuously provided on a rear face 12a, which is a surface of the drainage wall 14 and the inner sidewall 12 facing to the rear door frame 3d. There is formed a drain outlet 15 at the bottom end of the drainage wall 14 where no drainage rib is provided.

According to this embodiment, there is also provided a butyl sealer (or an EPT sealer) 17 between the upper part of the rear face 12a of the inner sidewall 12 of the molded part 11 and the rear door frame 3d. Further, an extrusion-molded part 16 is connected to the molded part 11.

In this rear door weather strip 10, when rainwater and the like passes through the butyl sealer (or the EPT sealer) 17 provided between the upper part of the rear face 12a of the molded part 11 and the rear door frame 3d, it is directed to the opening 3f by the drainage rib 13 provided on the rear face 12a of the drainage wall 14 and the inner sidewall 12. Then, the rainwater and the like flows in an hollow space 3e formed between the inner panel 3c and the outer panel 3b of the rear door frame 3d after entering from the opening 3f, and it is drained outside of the automobile. As a result, the rainwater and the like is prevented from intruding into an inside of the automobile. According to this rear door weather strip 10, it can direct the rainwater and the like into the opening 3f more successfully as the drainage wall 14 is provided.

With the rear door weather strip 10 in accordance with a first aspect of the invention, the inner sidewall 12 of the molded part 11 is provided as far as it reaches right above the opening 3f, and the drainage rib 13 for guiding water to the opening 3f is provided on the rear face 12a of the inner sidewall 12, so that water intruding from the upper end of a door frame 3d otherwise can be drained outside of the automobile successfully. Thus, the rainwater and the like is effectively prevented from intruding into an inside of the automobile.

With the rear door weather strip 10 in accordance with a second aspect of the invention, the inner sidewall 12 of the molded part 11 is provided as far as it reaches right above the opening 3f while the drainage wall 14 is provided extending from the bottom end of the inner sidewall 12 to the upper portion of the opening 3f. Further, the drainage rib 13 is provided on the rear face 12 of the drainage wall 14 for directing water to the opening 3f. Therefore, water intruding from the upper end of a door frame 3d is successfully drained outside of the automobile. Thus, the rainwater and the like is effectively prevented from intruding into an inside of the automobile.

According to the above described embodiments of the invention, the rear door is provided with a latch while the front door is not. However, the invention includes such structure that the front door is provided with a latch and the rear door is not.

Further, the invention also includes such structure that a double-doored closet style is provided at the back of the automobile instead of at the side, where the door in the right is provided with a latch while the door in the left is not, or vise versa.

Furthermore, according to the above described embodiments, the door with a latch is a rear door while the other door is a front door, where both doors are hinged doors and installed in a double-doored closet style. However, the invention further includes such structure that one of a pair of doors is a hinged door while the other is a sliding door.

The disclosure of Japanese Patent Application No. 2003-042007 filed February, 2003 including specification, claims, and drawings, is incorporated herein by reference.

What is claimed is:

1. A door weather strip system comprising a door weather strip attached to a door frame of an automobile provided with a latch wherein,
   - an automobile body is equipped with a first door provided with a latch and a second door not provided with a latch;
   - said automobile body does not have a center pillar;
   - an opening for installing a latch is formed at an upper end of one side of a door frame of said first door, where hinges are not provided;
   - an inner sidewall of a molded part of the door weather strip is attached to said upper end of the door frame;
   - said inner sidewall is provided as a bottom end of said molded part and reaches right above the opening; and
   - a drainage rib is provided at a rear face of said inner sidewall for directing water into said opening.

2. A door weather strip system comprising a door weather strip attached to a door frame of an automobile provided with a latch wherein,
   - an automobile body is equipped with a first door provided with a latch and a second door not provided with a latch;
   - said automobile body does not have a center pillar;
   - an opening for installing a latch is formed at an upper end of one side of a door frame of said first door, where hinges are not provided;
   - an inner sidewall of a molded part of the door weather strip is attached to said upper end of the door frame;
   - said inner sidewall is provided as a bottom end of said molded part and reaches right above the opening;
   - a drainage wall is provided at a bottom of said inner sidewall and a bottom end of said drainage wall reaches to an upper portion of said opening; and
   - a drainage rib is provided at a rear face of said inner sidewall and said drainage wall for directing water into said opening.

* * * * *